(12) United States Patent
Andree et al.

(10) Patent No.: US 12,009,160 B2
(45) Date of Patent: Jun. 11, 2024

(54) MONITORING METHOD FOR AN ELECTRIC POWER TRANSMISSION DEVICE

(71) Applicant: Siemens Energy Global GmbH Co. & KG, Munich (DE)

(72) Inventors: Hendrik Andree, Dankenfeld (DE); Matthias Heinecke, Berlin (DE); Thomas Lehmann, Berlin (DE); Benjamin Zaedow, Berlin (DE)

(73) Assignee: Siemens Energy Global GmbH & Co. KG, Munich (DE)

( * ) Notice: Subject to any disclaimer, the term of this patent is extended or adjusted under 35 U.S.C. 154(b) by 344 days.

(21) Appl. No.: 17/599,017

(22) PCT Filed: Feb. 28, 2020

(86) PCT No.: PCT/EP2020/055234
§ 371 (c)(1),
(2) Date: Sep. 28, 2021

(87) PCT Pub. No.: WO2020/193063
PCT Pub. Date: Oct. 1, 2020

(65) Prior Publication Data
US 2022/0044885 A1 Feb. 10, 2022

(30) Foreign Application Priority Data
Mar. 28, 2019 (DE) .................... 10 2019 204 307.0

(51) Int. Cl.
*H01H 11/00* (2006.01)
*H02H 5/04* (2006.01)
*H01F 27/30* (2006.01)

(52) U.S. Cl.
CPC ........ *H01H 11/0062* (2013.01); *H02H 5/041* (2013.01); *H01F 27/30* (2013.01); *H01H 2011/0068* (2013.01)

(58) Field of Classification Search
CPC ....... H01H 11/0062; H02H 5/041; H02H 5/04
See application file for complete search history.

(56) References Cited

U.S. PATENT DOCUMENTS

| 4,794,327 A | 12/1988 | Fernandes |
| 10,741,051 B2 | 4/2020 | Stupak et al. |
| 10,650,994 B2 | 5/2020 | Bauer et al. |

(Continued)

FOREIGN PATENT DOCUMENTS

| CN | 203225200 U | 10/2013 |
| DE | 102016213158 A1 | 1/2018 |

(Continued)

*Primary Examiner* — Scott Bauer
(74) *Attorney, Agent, or Firm* — Laurence A. Greenberg; Werner H. Stemer; Ralph E. Locher

(57) ABSTRACT

A monitoring method for an electrical energy transfer device which has a first phase conductor and a second phase conductor, includes the following steps: a temperature of the first phase conductor is compared with the temperature of the second phase conductor and a signaling is performed if there is a deviation between the temperatures. The electrical energy transfer device is, for this purpose, equipped at the first phase conductor with a first temperature sensor and at the second phase conductor with a second temperature sensor.

10 Claims, 2 Drawing Sheets

(56) References Cited

U.S. PATENT DOCUMENTS

| | | |
|---|---|---|
| 2011/0137483 A1 | 6/2011 | Jenkins et al. |
| 2011/0238374 A1* | 9/2011 | Lancaster ......... H02J 13/00001 |
| | | 702/184 |
| 2012/0194344 A1 | 8/2012 | McNamara et al. |
| 2014/0145849 A1 | 5/2014 | Huang et al. |
| 2014/0180616 A1 | 6/2014 | Aaserude et al. |
| 2014/0300486 A1 | 10/2014 | Hummel et al. |
| 2015/0255973 A1* | 9/2015 | Backe ................... F16F 15/023 |
| | | 248/568 |
| 2016/0036231 A1* | 2/2016 | Ramsay .................... G05F 1/70 |
| | | 323/205 |
| 2017/0146471 A1* | 5/2017 | Stupak ............... G01R 31/3275 |
| 2018/0098137 A1* | 4/2018 | Saha ...................... G06Q 10/20 |

FOREIGN PATENT DOCUMENTS

| | | |
|---|---|---|
| EP | 3171469 A1 | 5/2017 |
| WO | 2017174994 A1 | 10/2017 |

* cited by examiner

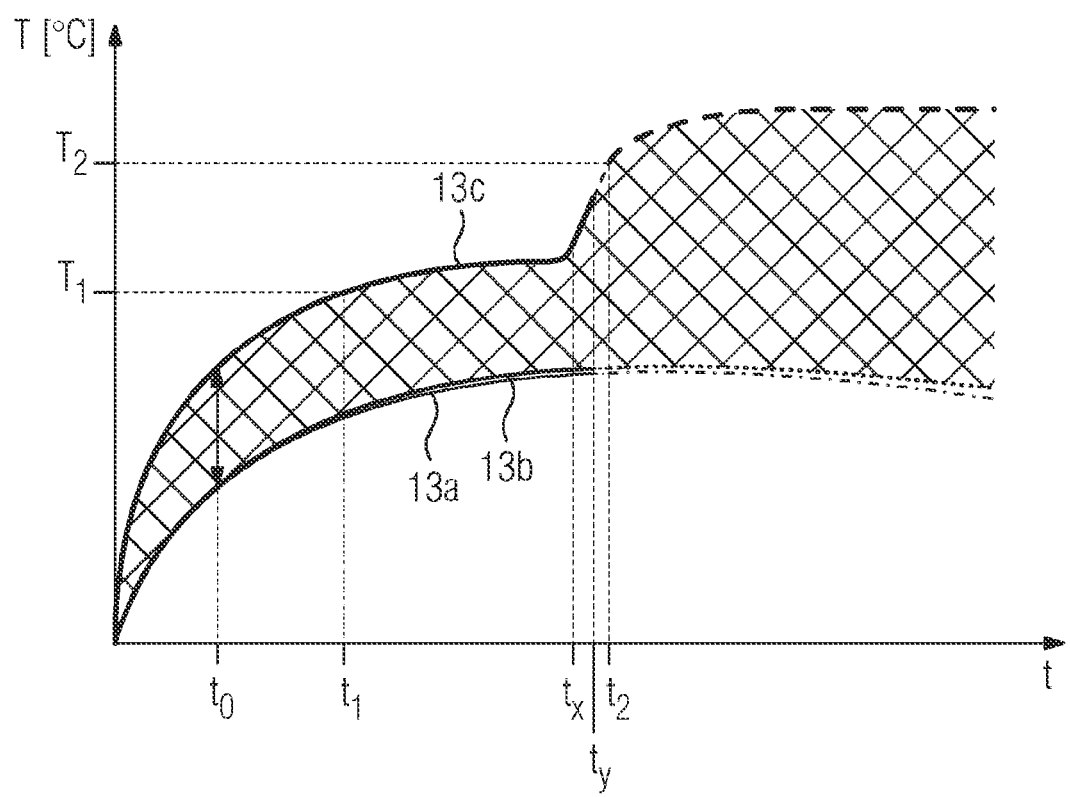

MONITORING METHOD FOR AN ELECTRIC POWER TRANSMISSION DEVICE

The invention relates to a monitoring method for an electric power transmission device having a first phase conductor and a second phase conductor.

An electric power transmission device having a first phase conductor and a second phase conductor is known from laid-open specification DE 10 2016 213 158, for example. This describes a switchgear arrangement that has, inside an encapsulating housing, multiple interrupter units that are each part of a phase conductor. The figure in said document shows a first phase conductor and a second phase conductor having a first interrupter unit and a second interrupter unit.

Firstly, great demands are made on switchgear arrangements in respect of the power to be transmitted. Secondly, the dimensions of such electric power transmission devices are supposed to be compact. Electric power transmission devices are therefore often designed such that only small reserves are held. In order to be able to operate safely under these constraints even in the event of overloads or faults, reliable monitoring of the electric power transmission devices is required.

SUMMARY OF THE INVENTION

The object arising is therefore that of specifying a suitable monitoring method for an electric power transmission device that allows safe operation of a first and a second phase conductor.

According to the invention, the object is achieved for a monitoring method of the type cited at the outset in that a temperature of the first phase conductor is compared with a temperature of the second phase conductor and in that if there is a difference between the temperatures then signalling is performed.

Electric power transmission devices are used for transporting electrical energy between two points. This requires a corresponding power to be transferred between the points. When driven by a potential difference, electric currents are routed via phase conductors. Phase conductors are electrically conductive devices that are used for carrying a current. Phase conductors are for example used as busbars, fitting bodies, coupling devices, in cables, on switching devices, in an outdoor-type embodiment (AIS), gas-insulated switchgear (GIS), in transformers, instrument transformers, etc. The phase conductors need to be appropriately electrically insulated. This can for example be accomplished by using fluid insulation, which is preferably in gaseous form. Furthermore, electrically insulating fluids can be used in the liquid state, however. The fluid can for example be enclosed inside an encapsulating housing and subjected to a pressure there, for example. The encapsulating housing in this case serves as a pressure container in order to withstand a differential pressure between the interior of the encapsulating housing and the surroundings of the encapsulating housing. A phase conductor, at least part of which is arranged inside the encapsulating housing, is electrically insulated inside the encapsulating housing by the electrically insulating fluid surrounding it.

Depending on the voltage system used, e.g. DC voltage or AC voltage, at least a first phase conductor and a second phase conductor need to be used. By way of example, in the case of a DC voltage system (DC) the first phase conductor can carry the forward current and the second phase conductor can carry the return current. In the case of an AC voltage system, in particular in the case of a polyphase AC voltage system, it is also possible for more than two phase conductors, preferably three phase conductors, to be used to transfer electrical power. A phase conductor has an AC voltage (AC) applied to it that drives an AC current in the phase conductor. Both in the case of AC applications and in the case of DC applications, the preferred load on the phase conductors is chosen such that each of the phase conductors transports approximately the same current, i.e. the same amount of energy. The current load on the phase conductor results in heating phenomena on the phase conductor. The electrical insulation used needs to be resistant to this heating. When the loads on the phase conductors belonging to an electric power transmission system are uniform, as is preferred, similar thermal loads on the individual phase conductors normally arise. Disturbances or perhaps unbalanced loads, in particular in the AC voltage system, can result in different current loads and consequent different thermal loads, however. In particular in the case of disturbances, partial or intermittent impedance increases can lead to corresponding increased thermal loads on the disturbed phase conductor. As such, contact faults, e.g. contact corrosion, erosion phenomena, faulty switching movements etc., can cause disturbance-related hotspots on electrical switching devices (interrupter units) in individual phases, for example. By measuring the temperatures at each of the phase conductors, that is to say at least at the first phase conductor and at least at the second phase conductor, it is easily possible to infer uniform loading among the individual phase conductors. External influences, such as insolation or other heat or cold phenomena, generally affect the phase conductors equally. Evaluation of a temperature difference provides the opportunity to compensate for external influences of this kind. By way of example, sensors for temperature measurement can be distributed at neuralgic points or uniformly or arranged in a specific section of a phase conductor. This can involve the use of so-called energy harvesting sensors, which for example obtain the necessary energy from the quantity to be measured, e.g. a temperature, so as for their part to perform their measurement function as a sensor. As such, it is for example possible to generate electrical energy on the basis of thermal differences between the surface of the phase conductor and the surroundings of the phase conductor and to use said electrical energy to measure the temperature of the phase conductor and, additionally, to use this electrical energy to transmit the information about the measured values. Such transmission can operate wirelessly, for example.

When the temperatures of the phase conductors have been ascertained, the temperatures are available regardless of the electrical state of the phase conductor. By way of example, the temperatures of the phase conductor can be monitored and evaluated even when the phase conductors are in the switched-off state (there is no flow of current). Evaluation in this case should preferably be effected by comparing the temperatures of the first and second phase conductors with one another. In an idealized setting, the temperature on the two phase conductors at the same instant is of approximately equal magnitude when the phase conductors are loaded uniformly, e.g. both phase conductors have no flow of current or both phase conductors have similar current loads. Exogenous thermal events, for example irradiation with heat and e.g. solar energy, heating or cooling elements, can also result in a difference in the temperatures on the phase conductors arising if the influence of the disturbing quantity is unequal. The difference in the temperatures is one of the criteria for the evaluation. If a difference in the temperatures ascertained on the two phase conductors or multiple phase conductors arises, this suggests that there is an atypical situation on one of the phase conductors. By way of example, a loosened joint can lead to a hotspot. In addition, worn switching contact pieces can lead to local temperature increases. If this occurs on one phase conductor only, then it cannot be assumed that there is normal aging or a general change in the phase conductors in the same way, but rather an event that requires closer consideration must be inferred. It is therefore possible to perform signalling if a difference between the temperature ascertained on the two phase conductors arises. Signalling can be performed in different ways in this case. Signalling can be prompted in the form of a warning or in the form of direct action on the switching installation, e.g. an emergency disconnection. Prior to signalling, a further indicator can be used in order to release signalling in a verified manner on the basis of the respective temperature difference, which can also have the magnitude zero. However, there can also be provision for verification to be performed only after signalling is released. Further steps can also take place after signalling.

There can advantageously be provision for the difference to be verified by a rate of change of a temperature of a phase conductor and/or of the difference in the temperature.

Besides the temperatures on the first and second phase conductors ascertained at the same instants, it is also possible to track a change in a temperature at a phase conductor over periods of time. This temperature change can occur at different rates. By way of example, a temperature change corresponding to a rise or fall in a (current) load on the phase conductors can occur. Such a rise in a specific time constant can therefore be attributed to normal operating behavior. If a difference between the temperatures at a selection of phase conductors (single or multiple from a group of phase conductors) arises and no correspondence to altered electrical loads (altered flow of current) is discernible, however, then this is an indication of the presence of an irregularity that requires closer consideration. In particular a rapid rise in temperatures/differences in temperatures suggests a disturbance. The transmission of electrical energy with regard to thermal changes is normally associated with long time constants. A high rate of change leads to a sharp rise in the characteristic of the respective measured temperature/difference in temperatures. A high rate of change, for example just on one of the phase conductors, also leads to a high rate of change of the ascertained temperature difference. Accordingly, the presence of differences in the temperatures on the phase conductors can result in the degree of the rate of change of a temperature/of a difference in temperatures being used to perform verification prior to said differences being signalled.

A further configuration can provide for a first electric current loading the first phase conductor to be compared with a second electric current loading the second phase conductor and that if there is a difference between the currents then the difference in the temperatures is verified.

In electric power transmission devices, the electric current flowing on a phase conductor and the electric voltage driving the current through the phase conductor are normally also measured. This information is available for example for actuating protective devices. In general, the change in an electric current should correspond to the consequent change in the temperature of the phase conductor carrying said electric current. It should be borne in mind that, owing to time constants, a change in temperature follows a rise in the electric current or a drop in the electric current in a delayed manner. In this respect, it may be necessary to take account of a delay so as not to arrive at misinterpretations. In general, however, increased load on a phase conductor should be accompanied by an increased temperature at the phase conductor. Conversely, a decrease in the load on the phase conductor generally entails a decrease in temperature. In this respect, it is advantageous to compare the current of the first phase conductor with the current of the second phase conductor and to ascertain a difference here. A difference in the currents should correspond to the difference in the temperatures of phase conductors, which means that a difference in the temperatures can be checked using a difference between the currents. By way of example, there can also be provision for the measured temperatures to be related to the measured currents in each case and for unbalanced loading among the phase conductors to be inferred if there is a correspondence, for example. This may be attributable to a specific operating regime and not to a disturbance in one of the phase conductors.

There can advantageously be provision for a temperature difference and a current difference of the respective phase conductors to be checked with regard to a similarity in the temperature difference and the current difference.

Besides a difference in temperatures between different phase conductors (difference can also be zero), there can also be a difference in the current load on the different phase conductors (current difference can be zero). Similar differences in the temperatures and the currents can suggest corresponding unbalanced loading. However, if there is a similar current load (no current difference, but rather a temperature difference), then this appears to indicate an irregularity given similar electric current load, which suggests a disturbance on a phase conductor. Accordingly, this check or crosscheck on the temperature differences and current differences among the respective phase conductors and the phase conductors can be used for verification, in particular prior to signalling being released. However, there can also be provision for verification to take place only after signalling is released. Depending on requirements, the different verification quantities, e.g. rate of change of a temperature, comparison of the change in electric currents and temperatures on the respective phase conductor, temperature difference and current difference among the phase conductors etc., can lead to increased quality of the monitoring of the load on the electric power transmission device.

Advantageously, there can further be provision for a difference to be checked for departure from a predefined tolerance band There can be provision for a tolerance band both for differences in respect of temperature and for differences in respect of electric current. Depending on the electric power transmission grid or electric power transmission device, unbalanced loads can arise, for example as a result of the presence of unbalanced consumers etc. Here, it is advantageous to define a tolerance band within which temperature differences or perhaps current differences between phase conductors are acceptable. Only in the event of a departure from the tolerance bands can this indicate the presence of a disturbance, as a result of which signalling is required. Besides a tolerance band for the differences themselves there can also be provision for allowance to be made for a temporal tolerance band for successive measured values for different physical quantities, e.g. for the electric current and temperatures. This takes account of the perpetually present time constant with which a temperature increase or temperature drop takes place in a delayed manner following a change in current.

A further advantageous configuration can provide for a forecast for the characteristic of the temperature load on at least one of the phase conductors to be produced from ascertained measured values in particular for temperatures and/or currents.

A temperature characteristic can be forecast from ascertained measured values of the temperature, possibly of a measured electric current. The time constant of the phase conductors can also be used in the forecast of the characteristic of the temperature load. By way of example, different heat emission responses in the phase conductor can arise depending on the use of the phase conductor, e.g. with fluid insulation, solid insulation, an enclosure etc. Accordingly, the phase conductor has a different time constant with which a thermal change takes place. This time constant can be used for example to forecast a threshold value being reached, for example, in the event of a rise in a temperature and an associated delayed further rise in the temperature. A forecast function describes the expected characteristic of a temperature change over time. As such, it is for example possible to infer the time at which a threshold value is reached by including the steepness ($1^{st}$ derivative of the forecast function) of the change in the temperature. To ascertain minima and maxima, a gradient method can be employed. In particular in the case of that can be attributed to disturbances, it is for example possible to make a switch in good time in order to avert the forecast reaching of a threshold value.

A further advantageous configuration can provide for the method steps to be performed in a decentralized data processing system.

The monitoring method should preferably be performed continuously. Depending on the available sensors or computing capacity, applicable measurements and comparisons and necessary conclusions or forecasts can be produced at shorter or longer intervals. A decentralized data processing system can be used to combine and link a multiplicity of pieces of information, for example including along a phase conductor, which means that local differences in measured values over the course of the phase conductor can also be diagnosed over a longer course of a phase conductor, for example. Decentralized data processing allows the data to be collected in decentralized fashion and possibly also handled and processed in decentralized fashion. There is therefore an opportunity for inexpensively providing adequate computing capacities, for example in order to monitor even extensive phase conductors for example in transmission grids. Such phase conductors can have distances of several hundred kilometers, a temperature measurement on the phase conductors being able to be performed at a plurality of points over their course. It is therefore possible to ascertain firstly the temperature difference between phase conductors but also the temperature difference over the course of the phase conductors.

A further advantageous configuration can provide for a computer program product that, when the program is executed on a data processing system, is designed to perform a method according to one of the preceding steps.

In particular continuous monitoring has the advantage that repeated measurement of temperatures is possible at short intervals of time. It is accordingly possible to quickly react to changes in the temperatures. Furthermore, appropriately accurate forecasts for an expected temperature characteristic can be provided. The data processing system can be a decentralized data processing system.

It is a further object of the invention to specify an electric power transmission device having a first phase conductor and a second phase conductor and having a first current measuring device with a second current measuring device for the first and second phase conductors, respectively, which can be subjected to monitoring by the monitoring method.

According to the invention, the object is achieved for an electric power transmission device of the type cited above in that the first phase conductor has a first temperature sensor and the second phase conductor has a second temperature sensor.

An electric power transmission device is used for transmitting electric power. This is accomplished by using phase conductors that are used to carry an electric current driven by a potential difference. The phase conductors are in electrically insulated form for this purpose. To monitor the current load on the phase conductors, a first current measuring device and a second current measuring device are arranged on the first phase conductor and on the second phase conductor, as a result of which a current load for the respective phase conductor can be ascertained. Additionally, the first phase conductor can have an associated first temperature sensor (sensor) and the second phase conductor can have an associated second temperature sensor (sensor). This allows not only a current load on the respective phase conductor but also the thermal load on the respective phase conductor to be ascertained. This allows for example both a current load and a temperature load to be ascertained and any differences in current load and thermal load on individual phase conductors to be checked, and any thermal differences arising to be rejected as being dependent on the operating situation. Appropriate signalling can be performed only in the event of disturbances arising, which have to exceed a tolerance band, for example.

A further advantageous configuration can provide for at least the temperature sensors to be connected to a decentralized computer system.

Incorporation of the temperature sensors into a decentralized computer system allows the information from the temperature sensors to be processed in decentralized fashion. The decentralized computer system (data processing system) can advantageously be configured differently than a computer system (data processing system) that is used for processing the information delivered by current measuring devices. Redundancy for the processing of the temperature values and current values can therefore be provided.

BRIEF DESCRIPTION OF THE FIGURES

An exemplary embodiment of the invention is shown schematically hereinafter in a drawing and described in more detail below. In the drawing, FIG. 2 shows a depiction of the ascertained measured values/of an ascertained forecast for the characteristic of a temperature load.

DETAILED DESCRIPTION OF THE INVENTION

Figure 1:
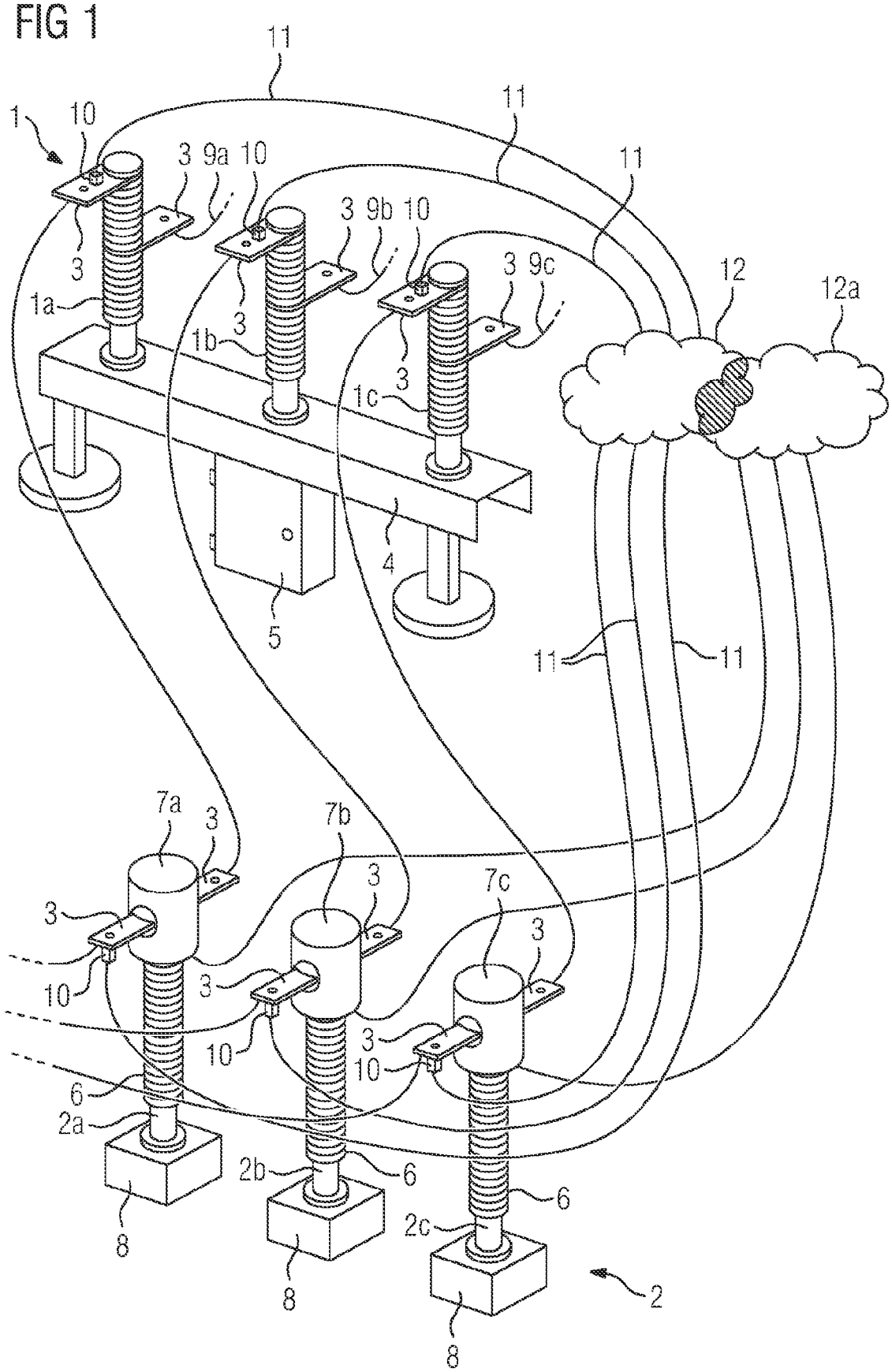
FIG. 1 shows a perspective view of an electric power transmission device with a decentralized data processing system.

FIG. 1 shows a first electric power transmission device 1 and a second electric power transmission device 2 in a perspective view. The first electric power transmission device 1 is a so-called outdoor-type circuit breaker. The outdoor-type circuit breaker is of three-pole design, i.e. it has a first breaker pole 1*a*, a second breaker pole 1*b* and a third breaker pole 1*c*. Each of the breaker poles 1*a*, 1*b*, 1*c* has an interrupter unit in its interior, which is used for interrupting a current path. The interrupter units can each have electrical contact made with them by way of connecting fittings 3. To this end, the connecting fittings 3 are arranged on electrically insulating housings of the respective breaker poles 1a, 1b, 1c. The breaker poles 1a, 1b, 1c of the first electric power transmission device 1 are arranged on a support frame 4. The support frame 4 is used to hold the breaker poles 1a, 1b, 1c at a distance from a foundation. The support frame 4 further has a secondary cabinet 5 mounted on it, in which secondary modules and a drive device are arranged. The drive device can be used to drive switching contact pieces of the breaker poles 1a, 1b, 1c that are movable relative to one another. The drive device can therefore be used to initiate a switching action of the first electric power transmission device 1. The secondary modules, which continue to be arranged in the secondary cabinet 5, are used for example for actuating, monitoring, protecting etc. the first electric power transmission device 1. The secondary modules can be control units, monitoring units, interfaces, sensors etc., for example.

The second electric power transmission device 2 is a current transformer, which is of three-pole design. Three current transformer poles 2a, 2b, 2c each have a post insulator 6. The respective post insulator 6 of the respective current transformer pole 2a, 2b, 2c is used to support a respective active part 7a, 7b, 7c in electrically insulated fashion. The active part contains a respective primary current path, which can have electrical contact made with it by way of connecting fittings 3 outside the active part 7a, 7b, 7c in each case. The respective primary current path of the respective active part 7a, 7b, 7c is used for extracting information about an electric current flowing through the primary conductor. By way of example, this can be accomplished by using a transformer principle in which, proceeding from the primary conductor, a transformation can be performed to a secondary winding (not discernible in the interior of the respective active part 7a, 7b, 7c in the figure). The measured values ascertained by the secondary part can for example be transmitted by wire or wirelessly to a secondary cabinet 8 located on the base of the respective current transformer pole 2a, 2b, 2c. The secondary cabinets 8 can contain appropriate secondary modules in order to further distribute the information provided by the instrument transformer about the flow of current for example via a data network.

The first electric power transmission device 1 and the second electric power transmission device 2 are incorporated in an electric power transmission line and connected up in series with one another. The electric power transmission line is a three-pole electric power transmission line used for transmitting a three-phase AC voltage. The electric power transmission line has a first phase conductor 9a, a second phase conductor 9b and a third phase conductor 9c. A respective one of the breaker poles 1a, 1b, 1c and a respective one of the current transformer poles 2a, 2b, 2c are arranged over the course of each of the three phase conductors 9a, 9b, 9c. As a result, a respective interrupter unit of a breaker pole 1a, 1b, 1c is arranged over the course of the respective phase conductor 9a, 9b, 9c, which interrupter unit is followed by the arrangement of a primary conductor of a current transformer pole 2a, 2b, 2b of an active part 7a, 7b, 7c. In the section of the electric power transmission line that is depicted in FIG. 1, an outdoor type is shown, i.e. the three phase conductors 9a, 9b, 9c are embodied as open air insulated cables in this part that is shown. In order to be able to make contact with the first electric power transmission device 1 and the second electric power transmission device 2, the phase conductors 9a, 9b, 9c are electrically conductively connected to the respective connecting fittings 3 of the respective breaker poles 1a, 1b, 1c and of the respective current transformer poles 2a, 2b, 2c.

The first electric power transmission device 1 can be used to switch the phase conductors 9a, 9b, 9c of the electric power transmission line, i.e. to interrupt or connect them. When there is an applicable flow of current on the individual phase conductors 9a, 9b, 9c, the current transformer poles 2a, 2b, 2c of the second electric power transmission device 2 can thus be used to ascertain the current flowing, or, when the phase conductors 9a, 9b, 9c are interrupted by the interrupter units of the breaker poles 1a, 1b, 1c, to detect disconnection of the electric current.

In order to ascertain further information about the state of the first or the second electric power transmission device 2, temperature sensors 10 are arranged on each of the breaker poles 1a, 1b, 1c and on each of the current transformer poles 2a, 2b, 2c. The temperature sensors 10 are used to detect the temperature of the respective phase conductors 9a, 9b, 9c that form part of the first and the second electric power transmission device 1, 2. In the present case, the connecting fittings 3 are used to position the temperature sensors 10. The connecting fittings 3 form a sufficiently mechanically robust receptacle for holding the temperature sensors 10. On the other hand, the connecting fittings 3 are parts of the phase conductors 9a, 9b, 9c and therefore carry an electric current flowing there and are subjected to a Joule heating effect. In the present case, the position of the temperature sensors 10 on the connecting fittings 3 is chosen such that only the connecting fittings 3 of the first electric power transmission device 1 or of the second electric power transmission device 2 that are situated on the output side are used. If required, however, there can also be provision for input-side positioning of temperature sensors 10 or perhaps both input-side and output-side positioning of temperature sensors 10.

The temperature sensors 10 are connected to a decentralized computer system 12 (data processing system) via information channels 11. The temperature sensors 10 can communicate with the decentralized computer system 12 directly. However, there can also be provision for local network devices, for example a local network device for the first electric power transmission device 1 and a local network device for the second electric power transmission device 2, to be provided that for example buffer-store or format the information (data) delivered by each of the temperature sensors 10, transfer said information to a specific data protocol, append further information such as temperature information from the surroundings, information about the position of the network device or of the temperature sensors 10 and add to the information delivered by the temperature sensors 10.

The decentralized computer system 12 that receives the data delivered by the temperature sensors 10 directly or indirectly via a network device can also perform processing for these data. Besides the decentralized computer system 12, there can be provision for a further computer system 12a. The further computer system 12a (further data processing system) can exchange information with the decentralized computer system 12. The further decentralized computer system 12a can be part of the decentralized computer system 12, and can be completely congruent therewith. However, there can also be provision for the further decentralized computer system 12 to be embodied completely independently of the decentralized computer system 12, as a result of which the information delivered by the current transformer poles 2a, 2b, 2c of the second electric power transmission device 2 about a flow of current is processed independently.

The decentralized computer system 12 can have a display device, for example, that can be used for example to present a graphical representation of measured values from the temperature sensors 10 or of forecast temperatures.

FIG. 2 depicts an applicable graph plotting a temperature T in degrees Celsius over time t. A first temperature threshold T1 and a second temperature threshold T2 are defined. The first temperature threshold T1 is a temperature value that reflects a high capacity level for one of the phase conductors 9a, 9b, 9c in thermal respects. Experience shows that this temperature is substantially influenced by a flow of current on the current conductors. Even if the temperatures on the current conductors are influenced externally, for example by insolation, said influence usually occurs on the first and second electric power transmission devices 1, 2 equally. In this respect, it is also possible to react to thermal overloads that are not caused exclusively by a flow of current on the phase conductors 9a, 9b, 9c. The second temperature threshold T2 reflects a temperature on the phase conductors 9a, 9b, 9c that cannot be tolerated and that leads to a requirement for action. By way of example, disconnection of the phase conductors 9a, 9b, 9c by the first electric power transmission device 1 can become necessary. FIG. 2 shows three graphs of three temperature characteristics. The first temperature characteristic 13a reflects the temperature characteristic on the first phase conductor 9a on the first breaker pole 1a. The second temperature characteristic 13b reflects the temperature characteristic of the second phase conductor 9b on the second breaker pole 1b of the first electric power transmission device 1. The third temperature characteristic 13c reflects the temperature profile of the third phase conductor 9c on the third breaker pole 1c of the first electric power transmission device 1. The temperature characteristics based on the temperature sensors 10 on the current transformer poles 2a, 2b, 2c of the second electric power transmission device 2 have not been shown in FIG. 2. If necessary, these temperature characteristics can be shown in a further graph or additionally in the graph shown in FIG. 2.

As is evident from the graphs of the first temperature characteristic 13a and the second temperature characteristic 13b, an approximately similar thermal response on the first breaker pole 1a and on the second breaker pole 1b of the first electric power transmission device 1 can be found up to a time ty. The third temperature characteristic 13c on the third breaker pole 1c of the first electric power transmission device 1 exhibits a different response. The temperature level on the third breaker pole 1c can consistently be assessed as higher than the temperature levels on the first breaker pole 1a and the second breaker pole 1b. There is a difference in the temperatures between the temperature characteristics 13a, 13b, 13c. The difference is still within a tolerance band up to the time t0, however. At the time t0, the difference in the temperatures leaves the tolerance band and signalling can be performed. Accordingly, the temperature on the third breaker pole 1c reaches the first temperature threshold T1 at the time t1. When the first temperature threshold T1 is reached, a warning (signalling) can be released. A steeper rise in the third temperature characteristic 13c can be found at the time tx. Up to a time ty, the temperature rises much more sharply than in the preceding periods. Based on this sharp rise, the third temperature characteristic 13c (dotted representation) can be forecast, and the second temperature threshold T2 is reached at a time t2 in the forecast. Subsequently, the rise in the third temperature characteristic 13c can exhibit a damped trend on the basis of the forecast.

Analogously to the forecast of the third temperature characteristic 13c, the first temperature characteristic 13a and the second temperature characteristic 13b can be predicted in a forecast for a period after ty.

Both in the realm of the measured values of the temperature characteristics 13a, 13b, 13c and in the realm of the temperature characteristics 13a, 13b, 13c there is a difference between the approximately similarly shaped first temperature characteristic 13a and second temperature characteristic 13b and the third temperature characteristic 13c. This difference is depicted in FIG. 2 by diamond-shaped shading. Accordingly, at any time the time t there is the possibility of ascertaining the difference in the temperatures of the first, second and third temperature characteristics 13a, 13b, 13c both for the measured values and for the forecast values. When a predefined tolerance band is reached or exceeded (at the time t0 here), appropriate signalling can be performed. For example, this can be done by way of appropriate shading being inserted, as shown in the graphical representation in FIG. 2, a change of color, etc. If necessary, an appropriate action recommendation can also be made.

In order to verify the present difference and the signalling, the information that can be obtained from the time characteristic can be consulted in addition. By way of example, the sharp rise that is present in the range tx-ty and the associated difference in the third temperature characteristic 13c as compared with the first and second temperature characteristics 13a, 13b can be used to verify the relevance of the difference. In addition, the information available about the flow of current on the phase conductors 9a, 9b, 9c can be used to verify the difference. As such, for example the information about the flow of current on the respective phase conductors 9a, 9b, 9c that is ascertained by the second electric power transmission device 2 in the individual current transformer poles 2a, 2b, 2c can be consulted. If there is a similar load, i.e. an approximately identical flow of current, on all three phase conductors 9a, 9b, 9c, with a difference having been ascertained within the temperature distribution in the three phase conductors 9a, 9b, 9c, then the presence of a disturbance can be inferred. A difference with regard to the presence of a disturbance can therefore be verified by evaluating the current loads.

Conversely, if the difference in temperatures matches with regard to a current load on the individual phase conductors 9a, 9b, 9c, signalling can be rejected before it is released.

The invention claimed is:

1. A monitoring method for an electric power transmission device having a first phase conductor and a second phase conductor, the monitoring method comprising:
    acquiring a temperature of the first phase conductor and a temperature of the second phase conductor;
    comparing the temperature of the first phase conductor with the temperature of the second phase conductor;
    if there is a difference between the temperatures of the first and second phase conductors, performing a signaling; and
    producing a forecast for a characteristic of a temperature load on at least one of the phase conductors from ascertained measured values.

2. The monitoring method according to claim 1, which comprises verifying the difference by a rate of change of a temperature of a phase conductor and/or a rate of change of the difference between the temperatures.

3. The monitoring method according to claim 1, which comprises comparing a first electric current loading the first phase conductor with a second electric current loading the second phase conductor and, if there is a difference between the currents, verifying the difference in the temperatures.

4. The monitoring method according to claim 3, which comprises checking a temperature difference and a current difference of the respective phase conductors with regard to a similarity in a temperature difference and a current difference.

5. The monitoring method according to claim 1, which comprises checking a difference for a departure from a predefined tolerance band.

6. The monitoring method according to claim 1, which comprises producing the forecast from measured temperature values and/or current values.

7. The monitoring method according to claim 1, which comprises performing the comparing and signaling steps in a decentralized data processing system.

8. A computer program product containing a non-transitory computer program which, when the program is executed on a data processing system, is designed to perform the method according to claim 1.

9. An electric power transmission device, comprising:
a first phase conductor and a second phase conductor;
a first current measuring device for said first phase conductor and a second current measuring device for said second phase conductor;
said first phase conductor having a first temperature sensor and said second phase conductor having a second temperature sensor; and
said first temperature sensor being configured to acquire a temperature of said first phase conductor and said second temperature sensor being configured to acquire a temperature of said second phase conductor, and wherein the temperature of the first phase conductor is compared with the temperature of the second phase conductor, a signaling is performed if there is a difference between the temperatures of the first and second phase conductors, and a forecast is produced for a characteristic of a temperature load on at least one of the phase conductors from ascertained measured values.

10. The electric power transmission device according to claim 9, wherein said first and second temperature sensors are connected to a decentralized computer system.

* * * * *